United States Patent Office 3,516,290
Patented June 23, 1970

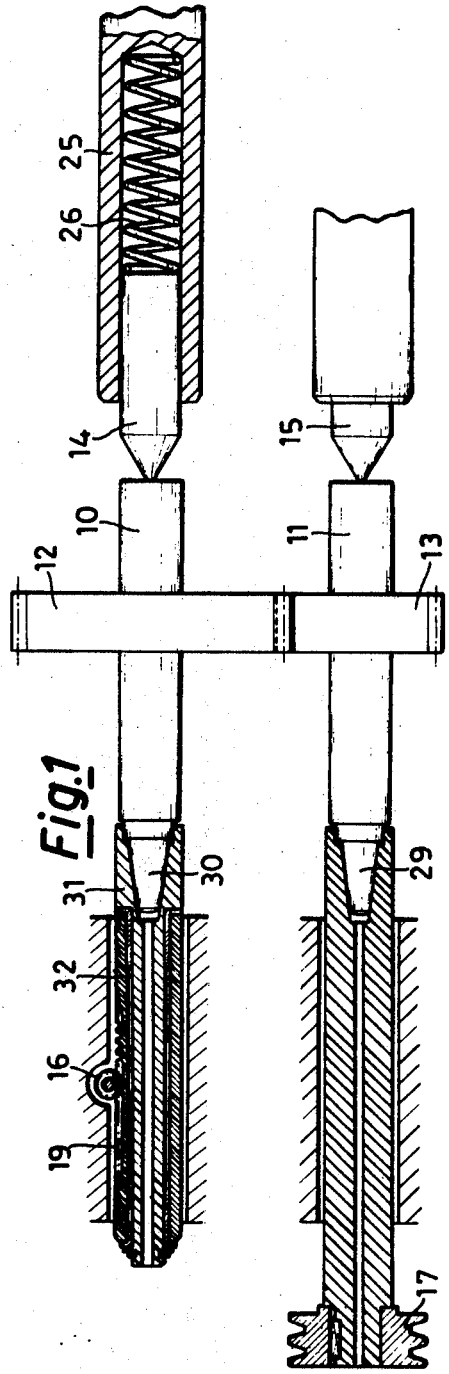
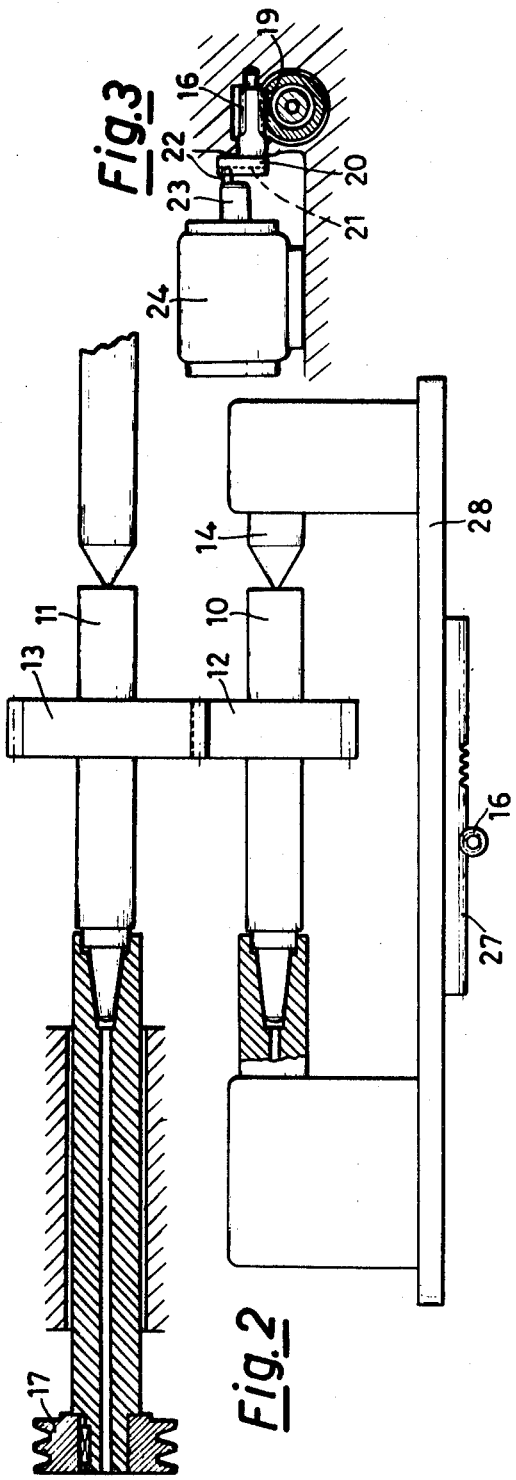

3,516,290
MACHINES FOR THE NOISE TESTING OF GEARS
Giampiero Matteucci, Porretta Terme, Bologna, Italy, assignor to S.p.A. Officine Meccaniche F.lli Daldi & Matteucci, Milan, Italy, a company of Italy
Filed Oct. 31, 1968, Ser. No. 772,200
Claims priority, application Italy, May 22, 1968, 16,833/68
Int. Cl. G01m 13/02
U.S. Cl. 73—162                                    5 Claims

ABSTRACT OF THE DISCLOSURE

A device for testing gears for the noise they produce during operation comprises first and second spindles supporting respective gears being tested such that the gears are in mesh, the first spindle being externally driven in rotation and driving the second spindle through the gears. The second spindle is coupled to a mechanism which drives the second spindle in reciprocation along a line such that the entire width of the face of the gear on the second spindle will mesh with the gear on the first spindle during the testing.

---

An object of this invention is to provide an improvement in machines for the noise testing of gears which is effected for the purpose of checking the degree of precision with which they have been made in order to eliminate possible defects which can prejudice their operation.

One of the systems for testing the noise level of gears is that of keying them with their teeth meshed onto two spindles made to rotate by means of a motor, and to grade the pieces by the noise level estimated by the superintendent of the machine.

By the use of devices of this type drawbacks are encountered however which can be thus summarized:

In gear wheels having the same width of tooth face it is not possible to compensate for possible differences of alignment in such a way as to include the extremities of the teeth in the test;

In gear wheels having slight differences in the width of the tooth face, it is not possible to include the whole of the width of the tooth face itself in the test.

Another object of this invention is to provide improvements in such devices by applying to them a mechanism which permits the complete exploration of the tooth face of each gear wheel during the noise test.

Consequently a device has been developed consisting of two spindles on to which the pair of gear wheels to be tested are keyed in mesh, a first spindle being made to rotate by means of a motor and a second spindle being put into rotation by means of transmission through the gear wheels under test, the said device being characterized by the fact inclusion of a kinematic motion device which imposes on the second spindle a straight line motion which is reciprocating with respect to the piece.

According to a preferred embodiment of the present device, counteracting elastic means are provided acting coaxially with respect to the second spindle which allow the said reciprocating motion for exploration of the whole tooth face of the gear wheels to be tested.

In particular the kinematic motion device according to the invention consists of a toothed shaft arranged at 90 degrees to the second spindle and engaged with a rack which is formed on it, a sector being fixed to one end of the said shaft and in which a slot is formed which is perpendicular to the shaft and passes through its axis of symmetry, a peg fixed eccentrically to the free end of a shaft of a motor being inserted into the slot so that it slides.

In order to better understand the characteristics of this invention it will be described hereafter with reference to the accompanying drawing in which:

FIG. 1 is a schematic representation, partly in cross-sections, of a first preferred embodiment of the device according to the invention;

FIG. 2 is a schematic representation, partly in cross-sections, of another embodiment of the invention; and FIG. 3 is a detail of the transmission system of the straight line reciprocating motion to the spindle of the device.

The device consists substantially of two spindles 10 and 11 arranged in parallel and whose free ends are supported on two coaxial corresponding centers 14 and 15.

The spindle 11 is driven in rotation from a motor (not shown) by means of a pulley 17 and through a coupling cone 29, and since spindle 11 carries a gear wheel 13 keyed onto it which is engaged with a corresponding gear wheel 12 keyed onto the spindle 10, the motion is transmitted to this latter. The spindle 10 is linked rigidly by means of the coupling cone 30 to the shaft 31 which, supported by two bushes, is free to rotate inside the hollow shaft 32.

A rack 19 is formed on the shaft 32 and is engaged with a toothed shaft 16 arranged at 90 degrees to the spindle.

At the opposite end of the shaft 16, a sector 20 is fixed in which a slot 21 is formed perpendicular to the shaft and intersecting its axis of symmetry. A peg 22 is freely inserted into the slot and is fixed eccentrically to the free end of the shaft 23 of a motor 24. In addition, the center 14 is housed so that it slides in a chamber 25 and is maintained in contact with the spindle 20 by a counter-acting spring 26. The device described up to now operates in the following way: the rotation of the shaft 23 by the motor 24 makes the peg 22 rotate around a circumference, and during the said rotation it causes the sector 20 and hence the toothed shaft 16 to rotate around its axis through an angle less than 360 degrees with a circular reciprocating motion, because of the said coupling between the peg 22 and the slot 21.

Following the engagement between the shaft 16 and the rack 19 of the shaft 32, the said circular reciprocating motion is transformed into a straight line reciprocating motion of the shaft 32 and consequently of the spindle 10. From this it is clearly understandable how the teeth of the gear wheel 12 accomplish a complete excursion over the entire tooth face of the gear wheel 13 and vice versa.

In FIG. 2 another embodiment of the invention is illustrated in which the parts substantially equal to those already illustrated and described in FIG. 1 have the same reference numbers consigned to them.

In the embodiment described above, the kinematic motion device, which is the object of the present invention, transmits a straight line reciprocating motion only to the spindle, while the center is maintained in contact with it by a counteracting spring.

In FIG. 2 it is seen how the same kinematic motion device can be realized differently by making the spindle 10 and the relative sustaining center 14 move concurrently, and the center in this case does not have to be provided with the counteracting spring 26.

In fact, the shaft 16 instead of being engaged directly with the spindle 10 is engaged with a rack 27 formed on a supporting base 28 on which the spindle and center are fixed.

The advantages of the embodiments described above can be summarized as follows: both for gear wheels having an equal width of tooth face and those having slight differences in the width of the tooth face it is possible to compensate for possible differences of alignment and have the possibility of exploring, during the noise test, the entire tooth face, including the extremities.

What is claimed is:

1. Apparatus for the noise testing of gears comprising first and second spindles on which the pair of gear wheels to be tested are keyed in mesh, means to rotate said first spindle, said second spindle being driven in rotation by transmission through the gear wheels under test, and a kinematic motion device acting on said second spindle to displace the same along a straight line in reciprocation with respect to the first spindle, said kinematic motion device including counteracting resilient means which acts coaxially with respect to the said second spindle.

2. A device as claimed in claim 1 comprising center members supporting said spindles at the free ends thereof, said resilient means comprising a spring acting on the sustaining center member of said second spindle and assembled so as to allow the center member to effect said straight line reciprocating motion together with said second spindle.

3. Apparatus for the noise testing of gears comprising first and second spindles on which the pair of gear wheels to be tested are keyed in mesh, means to rotate said first spindle, said second spindle being driven in rotation by transmission through the gear wheels under test, and a kinematic motion device acting on said second spindle to displace the same along a straight line in reciprocation with respect to the first spindle, said kinematic motion device including a toothed shaft extending at 90° with respect to the second spindle, a rack coupled with said spindle and in mesh with said shaft, a sector member fixed to said shaft and having a slot formed perpendicular to the shaft and intersecting a symmetrical axis thereof, a peg slidably inserted in said shaft, and a rotatable shaft on which said peg is fixed eccentrically at the free end thereof.

4. A device as claimed in claim 3, wherein said kinematic motion device further comprises counteracting resilient means which acts coaxially with respect to said second spindle.

5. A device as claimed in claim 3 comprising center members supporting said spindles at the free ends thereof, said resilient means comprising a spring acting on the sustaining center member of said second spindle and assembled so as to allow the center member to effect said straight line reciprocating motion together with said second spindle.

References Cited

UNITED STATES PATENTS 3,069,813  12/1962  Bauer et al.

LOUIS R. PRINCE, Primary Examiner

W. A. HENRY, Assistant Examiner